(12) United States Patent
Wang

(10) Patent No.: US 8,503,001 B2
(45) Date of Patent: Aug. 6, 2013

(54) APPROACH FOR UPDATING USAGE INFORMATION ON PRINTING DEVICES

(75) Inventor: Sam Wang, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 1006 days.

(21) Appl. No.: 12/141,705

(22) Filed: Jun. 18, 2008

(65) Prior Publication Data
US 2009/0316175 A1 Dec. 24, 2009

(51) Int. Cl.
*G06K 15/00* (2006.01)
(52) U.S. Cl.
USPC ............... 358/1.14; 358/1.15; 399/79; 700/9; 700/237
(58) Field of Classification Search
USPC ............... 358/1.14, 1.13, 1.15, 1.9; 235/378, 235/382, 383; 281/2; 379/114.17; 399/79; 455/407; 700/2, 237, 238, 83, 9; 703/22; 705/41, 7.26; 709/223; 713/182; 717/125, 717/168
See application file for complete search history.

(56) References Cited

U.S. PATENT DOCUMENTS

| | | | |
|---|---|---|---|
| 6,915,342 B1 | 7/2005 | Motoyama | |
| 7,334,224 B2 | 2/2008 | Haga et al. | |
| 7,631,350 B2 | 12/2009 | Parry | |
| 2001/0028465 A1* | 10/2001 | Sugino | 358/1.9 |
| 2002/0087961 A1 | 7/2002 | Dorricott | |
| 2002/0199173 A1* | 12/2002 | Bowen | 717/129 |
| 2003/0122871 A1 | 7/2003 | Darlet et al. | |
| 2003/0177421 A1* | 9/2003 | Baker et al. | 714/48 |
| 2003/0221186 A1* | 11/2003 | Bates et al. | 717/125 |
| 2004/0049552 A1 | 3/2004 | Motoyama et al. | |
| 2004/0093598 A1 | 5/2004 | Haga et al. | |
| 2004/0184467 A1 | 9/2004 | Watanabe | |
| 2004/0215706 A1 | 10/2004 | Lavender et al. | |
| 2005/0132349 A1 | 6/2005 | Roberts et al. | |
| 2005/0216895 A1* | 9/2005 | Tran | 717/127 |
| 2005/0257214 A1 | 11/2005 | Moshir et al. | |
| 2005/0275867 A1* | 12/2005 | Higashiura et al. | 358/1.14 |
| 2006/0026434 A1* | 2/2006 | Yoshida et al. | 713/182 |
| 2006/0078346 A1* | 4/2006 | Lovat et al. | 399/79 |
| 2006/0126100 A1* | 6/2006 | Jung | 358/1.14 |

(Continued)

FOREIGN PATENT DOCUMENTS

| | | |
|---|---|---|
| JP | H 06-222956 | 8/1994 |
| JP | H 09-325927 | 12/1997 |

(Continued)

OTHER PUBLICATIONS

Pages from Stallman et al., "Debugging with GDB", May 10, 2006, downloaded from Internet Archive at URL < http://web.archive.org/web/20060510224136/http://www.gnuarm.com/pdf/gdb.pdf>.*

(Continued)

*Primary Examiner* — King Poon
*Assistant Examiner* — David S Cammack
(74) *Attorney, Agent, or Firm* — Hickman Palermo Truong Becker Bingham Wong LLP

(57) ABSTRACT

A printing device includes a user interface, a print module, memory and a device agent. The device agent is configured to modify usage information stored in the memory of the printing device. Based on values in the usage information, one or more processes operating on the printing device may be suspended. If so suspended, a user may contact an administrator who operates the device agent to modify the usage information, and permit the one or more processes to resume.

20 Claims, 5 Drawing Sheets

U.S. PATENT DOCUMENTS

| | | |
|---|---|---|
| 2007/0162460 A1 | 7/2007 | Long |
| 2008/0005733 A1 | 1/2008 | Ramachandran et al. |
| 2008/0085741 A1 | 4/2008 | Tauberman et al. |
| 2008/0127115 A1 | 5/2008 | Bystricky et al. |
| 2009/0066995 A1* | 3/2009 | Mukund et al. .............. 358/1.15 |
| 2009/0119681 A1 | 5/2009 | Bhogal et al. |
| 2010/0085597 A1 | 4/2010 | Vulugundam |
| 2010/0088693 A1 | 4/2010 | Vulugundam |
| 2010/0220358 A1 | 9/2010 | Beninato et al. |

FOREIGN PATENT DOCUMENTS

| | | | |
|---|---|---|---|
| JP | 2003084982 A | 3/2003 | |
| JP | 2003233512 A | 8/2003 | |
| JP | 2003-276284 A | 9/2003 | |
| JP | 2003296132 A | 10/2003 | |
| JP | 2004194284 A | 7/2004 | |
| JP | 2008062582 A | 3/2008 | |

OTHER PUBLICATIONS

U.S. Appl. No. 12/247,176, filed Oct. 7, 2008, Notice of Allowance, Mailing date Mar. 14, 2013.

* cited by examiner

FIG. 3

| User ID | Color output | B&W output | Scan | Fax |
|---|---|---|---|---|
| User 1 | 100 | 500 | 500 | 50 |
| User 2 | 200 | 1200 | 300 | 50 |
| User 3 | 75 | 2000 | 500 | 50 |
| User 4 | 1000 | 1500 | 500 | 50 |
| ... | ... | ... | ... | ... |

300

APPROACH FOR UPDATING USAGE INFORMATION ON PRINTING DEVICES

FIELD OF THE INVENTION

This invention relates generally to the copying, printing, scanning and facsimile transmission of documents. In particular, this invention relates to modification of usage information stored on a multi-function peripheral.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The use of multi-function peripheral (MFP) devices has proliferated as offices have become more automated and less dependent on manual devices. Because of the potential of misuse, or a desire to accurately track expenses, many MFP devices are equipped with a cost control system. Typically, in a cost control system, every user has an account that is limited by the available funds in the account. Under such a cost control system, the user may begin a job which abnormally terminates prior to completion because of insufficient funds in the user's account, or because of other user permission issues.

Oftentimes, when a job abnormally terminates, the user's only recourse is to seek a modification of the usage information. For understandable reasons, users are generally not given permission to modify usage and account information, so the user must contact an administrator who can adjust the account information and restart the operation. Unfortunately, with existing MFP devices, a usage information adjustment requires a re-boot of the MFP device, resulting in loss of all current job information. Such a re-boot is inefficient as it leads to wasted physical resources and wasted labor.

Based on the foregoing, there is a need for an approach for adjustment of usage information of MFPs in real-time.

SUMMARY

A printing device includes a user interface, a print module, memory and a device agent. The device agent is configured to modify usage information stored in the memory of the printing device, and is accessible to an administrator who may be remotely located from the printing device. The administrator modifies the usage information without resort to a re-boot of the printing device and without affecting other processes operating on the printing device.

BRIEF DESCRIPTION OF THE DRAWINGS

In the figures of the accompanying drawings, like reference numerals refer to similar elements.

FIG. 3 is a block diagram that depicts a sample table of usage information.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
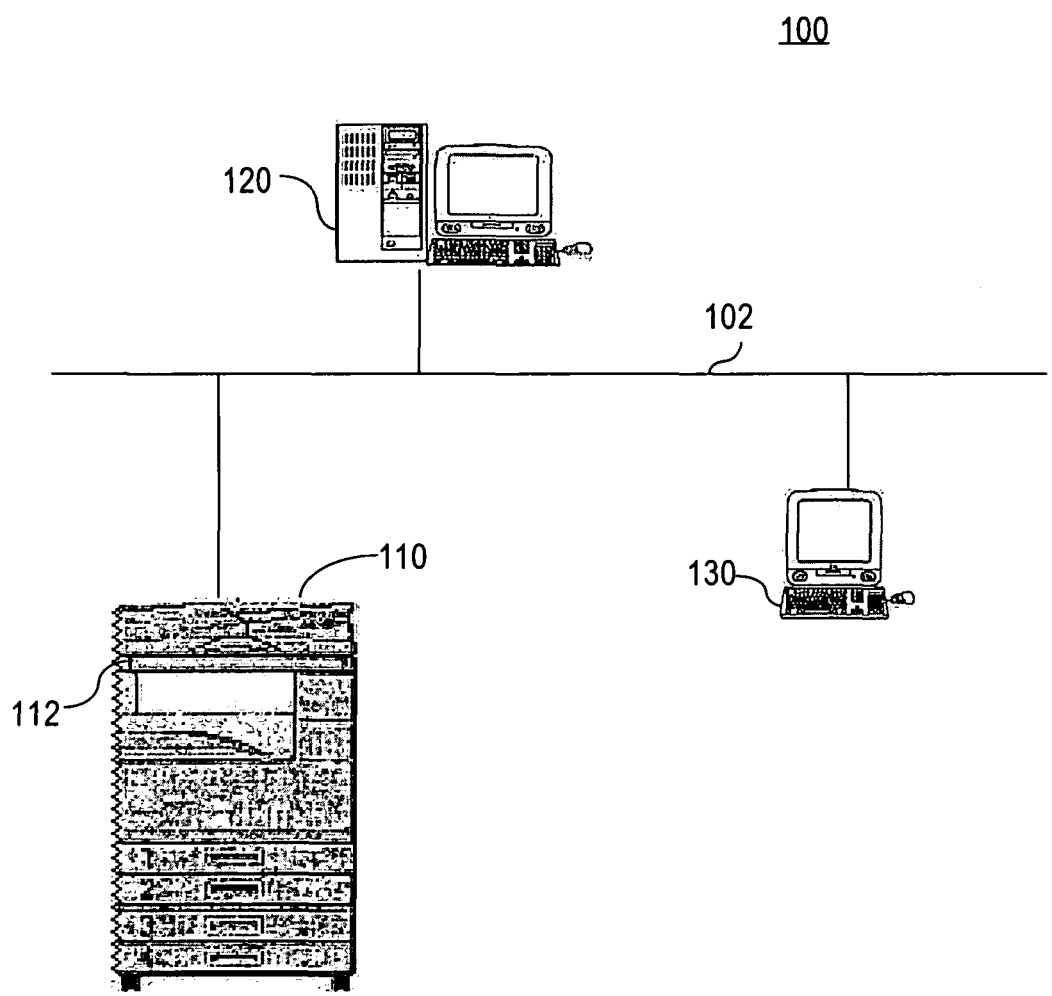
FIG. 1 is a block diagram of a multi-function peripheral connected to a network.

FIG. 1 depicts system 100 in which a multi-function peripheral (MFP) 110 is connected to a network 102 to which an administrative computer 120 and a user computer 130 are connected. MFP 110 typically provides functions for copying, printing, scanning and facsimile transmission of documents. User access to MFP 110 is provided by a user interface 112 on MFP 110. In an embodiment, user access to MFP 110 is provided by user computer 130.

In an embodiment, administrative functions such as monitoring and remote control functions of MFP 110 are provided on administrative computer 120. Administrative computer 120 may be physically located anywhere access to network 102 is available. A user is granted access to MFP 110 after providing a sign-on identification and one or more parameters (such as password authentication, print job, print job number, etc.) through user computer 130.

In an embodiment, information regarding MFP usage ("MFP usage information") is stored on MFP 110. MFP usage information is further described below. As the MFP 110 is operated by the user, one or more processes on MFP 110 are suspended when it is determined use of MFP 110 has exceeded at least one parameter contained in the MFP usage information, or the one or more processes are otherwise suspended based on a comparison between the MFP usage information and another value (such as time of day or the number of jobs in a print queue). The determination that use of MFP 110 has (1) exceeded at least one parameter or (2) otherwise requires suspension could be made by one or more of MFP 110, administrative computer 120, and user computer 130.

Figure 2:
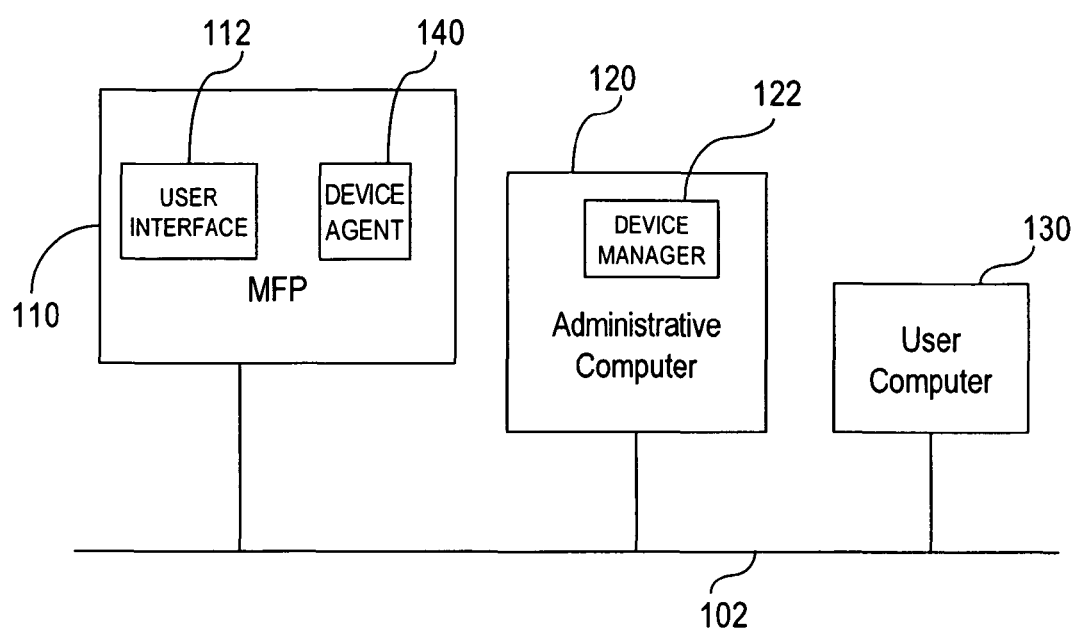
FIG. 2 is a block diagram of the hardware and software components of the multi-function peripheral connected to a network.

FIG. 2 depicts example hardware and software components of the MFP 110. MFP 110 may include numerous other modules and processes for implementing the various functionality supported by MFP 110, such as printing, scanning, facsimile transmission, etc., that are not depicted in FIG. 2 or described herein for purposes of brevity. A device agent 140 is located in MFP 110 and controls access to MFP usage information stored in the memory of MFP 110. Device agent 140 can be implemented in computer hardware, software, or any combination thereof. In an embodiment, access to and control of device agent 140 is permitted through device manager 122 located in administrative computer 120. An administrator using administrative computer 120 issues device commands sent to device agent 140.

Although FIG. 2 depicts only one MFP 110, device manager 122 is configured to permit access to and control multiple device agents residing on multiple MFPs connected to the network. Device manager 122 can be implemented in computer hardware, software, or any combination thereof. In an embodiment, at least partial access to device agent 140 is permitted through user computer 130.

Device agent 140 is configured to modify usage information stored on a memory of MFP 110 without requiring reboot of the operating system residing on MFP 110. In an embodiment, device agent 140 includes remote debugging software. One example of remote debugging software is Field Diagnostics produced by Wind River Systems, that permits access to selected portions of the memory of MFP 110. Use of remote debugging software permits upgrading of legacy systems in which attempts to modify usage information would likely result in abnormal termination of processes executing on MFP 110.

In an embodiment, device agent 140 accesses a table that maps one or more device commands into one or more modification instructions that when executed modify the memory storing the usage information. For example, device agent 140 could receive a command corresponding to "change value to 100," and then access a table to find the corresponding modification instruction "LOAD 100" that is executed to change the value.

In an embodiment, device agent 140 accesses a table that maps one or more items of usage information into one or more memory locations in the memory of MFP 110. For example, device agent 140 could receive a command corresponding to "locate the first usage information value for user 'User 1'," and then access a table to find the corresponding memory location of 0xffff0000.

In an embodiment, device agent 140 accesses one or more memory locations in the memory of MFP 110 to modify any attributes of user interface 112. This modification could, for example, contain instructions for operating user interface 112. For example, device agent 140 could receive a set of commands to enlarge button size on user interface 112 in order to assist a visually impaired user. Similarly, device agent 140 could receive a set of commands to add or disable features available on user interface 112. For example device agent 140 could receive a set of commands to disable a two-sided copy feature for a particular user.

In an embodiment, device agent 140 is configured to present a user interface on administrative computer 120 or user computer 130 to display the usage information and to accept input commands to modify the usage information. In an embodiment, the user interface on administrative computer 120 or user computer 130 is in the form of a web page. In an embodiment, MFP 110 contains access software to control access to all or a portion of device agent 140.

FIG. 3 is a block diagram that depicts a sample table of usage information. Note that while usage information is depicted in FIG. 3 and described herein in the form of a table, this disclosure is strictly for the convenience of the reader, as in actual embodiments usage information may be stored using a variety of formats, data structures and methods. Similarly, the types of usage information depicted in FIG. 3 is merely illustrative and not intended to be limiting in any way. For example, usage information may comprise computer hardware or software instructions that render user interface 112 on MFP 110. The administrator could then access device agent 140 and load computer hardware or software instructions to customize user interface 112 for a particular user.

In FIG. 3, usage information table 300 is arranged in tabular form, with all usage information for a particular user stored in a row of usage information table 300. Each column of usage information table 300 corresponds to an individual parameter contained within the usage information. The first row and first column of usage information table 300 both contain headings describing the data contained within the main body of usage information table 300.

For example, entry (1,1) of usage information table 300 contains the heading "User ID" with entry (3,1) containing the name "User 2." According to entry (3,4) of usage information table 300, user "User 2" is permitted a limit of 300 scanning units. As used herein, a "unit" could correspond to a page, a dollar amount, or some other value.

In an embodiment, usage information for each user includes one or more of function permissions, function parameters, balance, and print priority. A function permission might be used to restrict one or more functions (such as scanning); a function parameter might be used to specify a value (such as a time limit) that corresponds to use of a function; a balance might be used to store an account balance or specify a balance limit; and a print priority might be used to prioritize jobs waiting in one or more queues.

Such usage information could be used in a variety of manners unrelated to cost control. For example, a user could attempt to print a file for which the user currently lacks the appropriate permission level as indicated in the usage information. An administrator willing to modify the usage information could then do so without performing a re-boot that would kill all print jobs or other processes that are residing in one or more queues.

Figure 4:
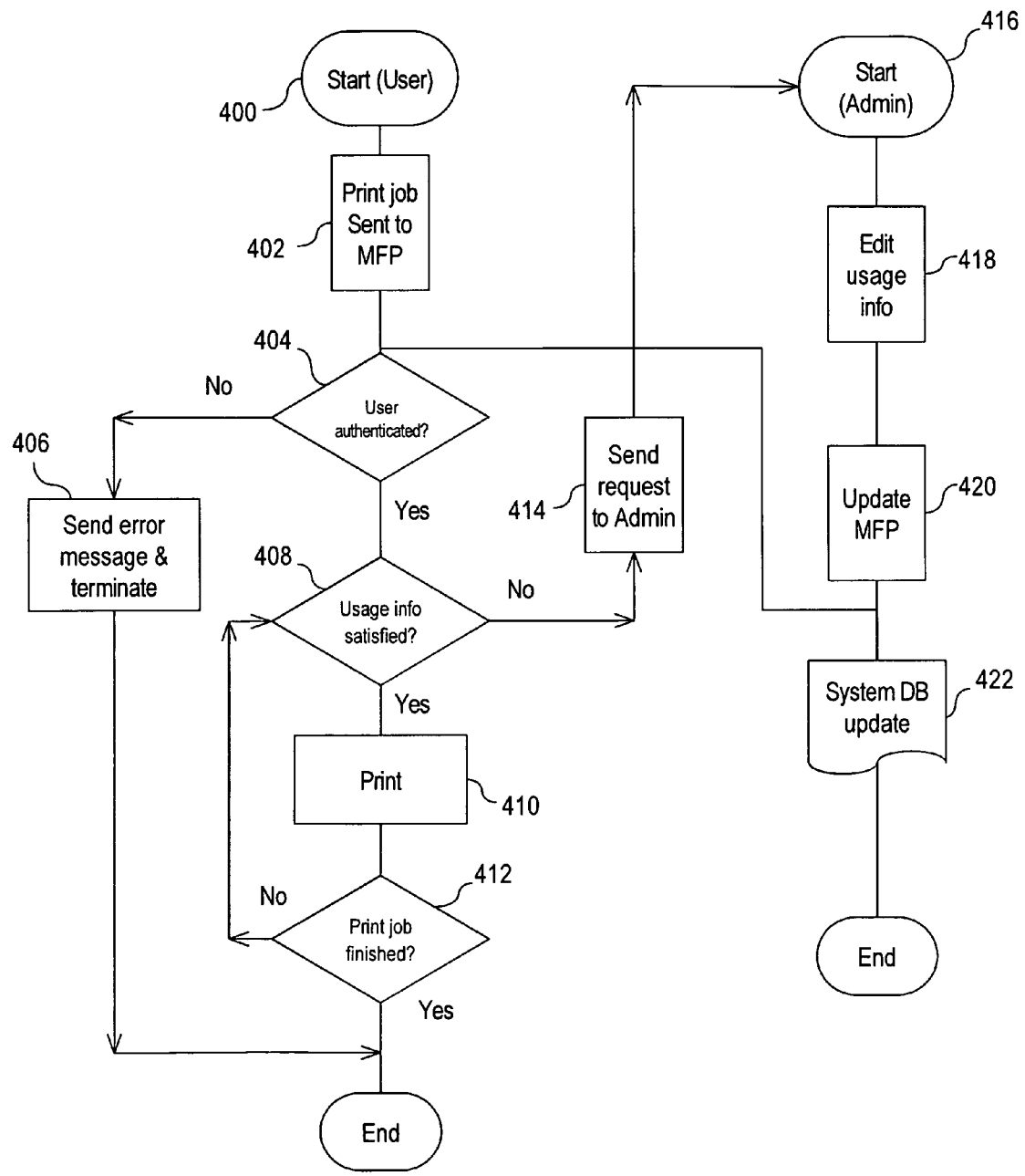
FIG. 4 is a flow diagram that depicts an approach for modification of usage information.

FIG. 4 is a flow diagram that depicts an approach for modifying usage information on an MFP. The user begins at step 400. In step 402, a user sends a print job to an MFP from a user computer. Some or all of this print job may be stored on the MFP's hard disk drive. In step 404, the user is queried for authentication purposes. Should authentication fail, the user is notified in step 406 and the print job aborts.

Should authentication succeed, in step 408 the user's usage information is checked. Should the usage information indicate the print job can be satisfied, the print job begins in step 410. In step 412, the print job status is reviewed, and control is returned to step 408 until the print job is finished. Should the usage information indicate the print job can no longer be satisfied (or some other suspension be triggered in step 408), an administrator is notified with a request to intervene in step 414.

The administrator begins at step 416. In step 418, the administrator activates the device agent of the MFP, and in step 420, modifies the usage information at issue. In an embodiment, the administrator using administrative computer 120 issues commands to view or modify the usage information, and these commands are converted into modification instructions and subsequently executed by device agent 140 to change one or more memory locations in the memory of MFP 110. In an embodiment, device agent 140 accesses one or more tables to convert commands into modification instructions.

If necessary, in step 422 the administrator performs any accompanying system database updates and then ends the administration process.

Of course, the feature of administrative modification of usage information is not limited to those situations in which intervention is necessary to permit an MFP function to resume. For example, an administrator could modify the usage information at other times or to add or delete users. An administrator could modify usage information to: (1) lower a value such as a balance limit or lower a print priority for print jobs waiting on or more queues, or (2) reset usage information such as a monthly starting balance. Similarly, the status review in step 412 could be modified to trigger warning messages to the user before a job is suspended.

The following illustrative example indicates the flexibility and power of the approach described herein. In this example, a user desires to perform a print job that totals 5000 pages and takes 30 minutes, and the user's usage information indicates a balance of 5500 units available for printing. Should the cost of printing one page consist of 1 unit, the user is able to perform the print job without suspension.

However, suppose the cost of printing one page varies by the time of day; in this example, the cost is 1 unit from noon until 3:00 pm, and 1.5 units from 3:00 pm until 5:00 pm. Should the user start the print job at 2:50 pm, at some point after 3:00 pm, the user's printing balance will be exhausted prior to job completion.

Absent the novel systems and methods described herein, once the user's printing balance is exhausted, the print job aborts, and the user must begin from scratch once the user has received authorization to continue and the MFP has been rebooted. However, under the novel systems and methods described herein, the print job would suspend when the printing balance was exhausted, and then resume where it left off once an administrator adjusted the usage information. The resumption would not disrupt other print jobs or processes on the MFP.

Figure 5:
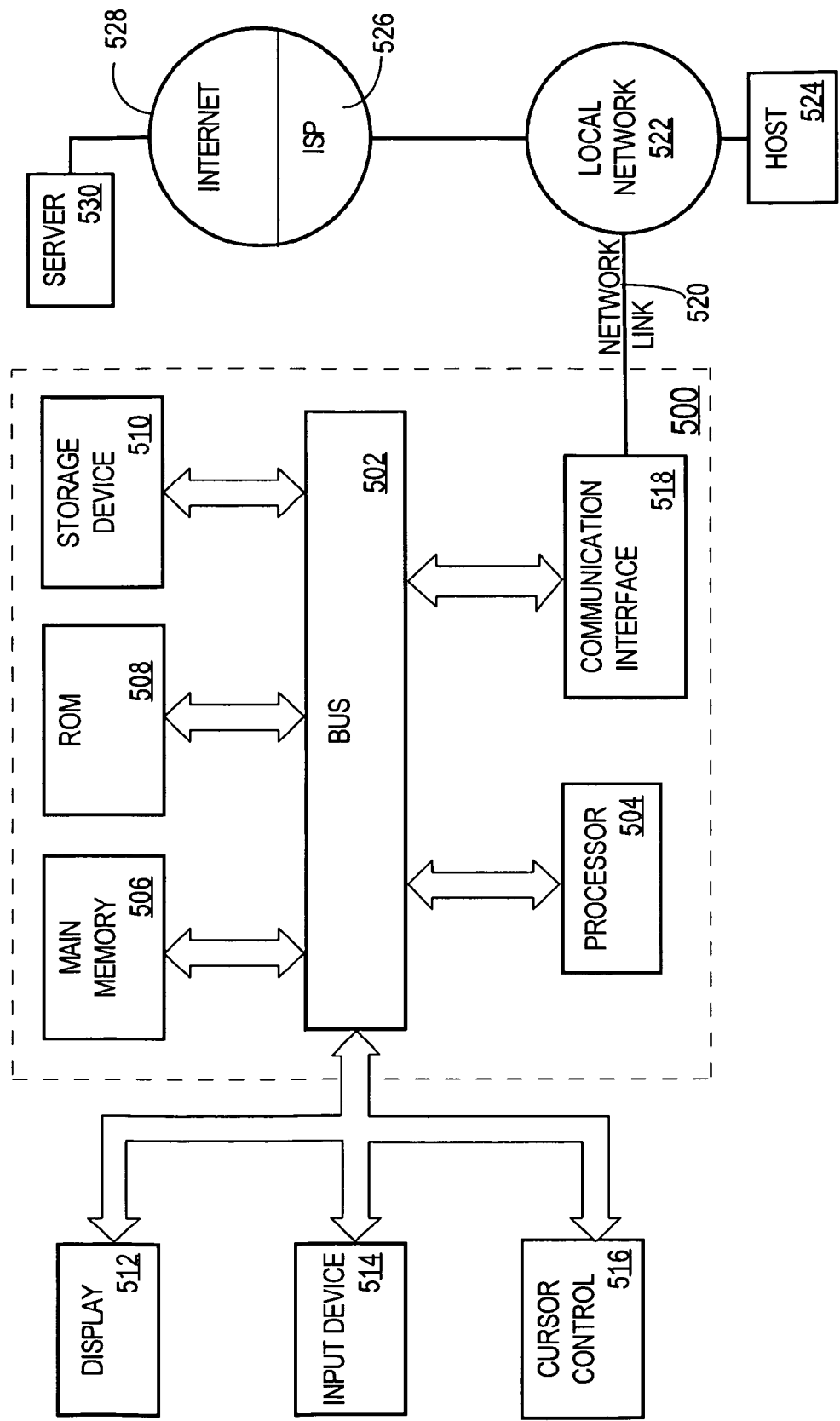
FIG. 5 is a block diagram of a computer system on which embodiments of the invention may be implemented.

The approach described herein for managing usage information may be implemented on any type of computing platform or architecture. For purposes of explanation, FIG. 5 is a block diagram that depicts an example computer system 500 upon which embodiments of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 500, various computer-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
   a user interface configured to display information to users and receive user input from the users;
   a print module configured to process print data and cause a printed version of an electronic document contained in the print data to be generated by the printing device; and
   a device agent configured to receive, over a network from a device manager, one or more device commands to modify usage information corresponding to a particular user and stored on a memory in the printing device, wherein a modification of the usage information corresponding to a particular user is performed concurrently with execution of one or more processes operating on the printing device and during a suspension of one or more print jobs, and wherein a modification of the usage information allows resumption of the one or more print jobs;
   wherein the device agent comprises remote debugging logic, and wherein the one or more device commands are in a format that is supported by the device manager and not supported by the remote debugging logic;
   wherein the device agent is further configured to process the one or more device commands by:
      accessing a table that maps a plurality of device commands to modify usage information into a plurality of modification instructions, wherein the plurality of modification instructions are supported by the remote debugging logic,
      identifying, based upon the table, one or more modification instructions that both correspond to the one or more device commands and that are supported by the remote debugging logic, and
      causing the one or more modification instructions to be executed to modify the usage information stored in the memory to allow resumption of the one or more print jobs.

2. The printing device of claim 1, wherein the usage information includes username, and further includes one or more of function permissions, function parameters, balance, and print priority.

3. The printing device of claim 2, wherein the function permissions includes permissions for one or more of copy, printer, scanner, and facsimile transmission.

4. The printing device of claim 1, wherein the device agent is further configured to access a table that maps one or more items of usage information into one or more memory locations in the memory storing the usage information.

5. The printing device of claim 1, wherein the device agent is further configured to present a user interface configured to display usage information and to accept device commands to modify the usage information.

6. The printing device of claim 5, wherein the one or more modification instructions include one or more instructions that when executed modify one or more elements of the user interface.

7. The printing device of claim 5, wherein the user interface is a web page that is displayed on an administrative computer.

8. A non-transitory computer-readable storage medium storing instructions for modification of usage information corresponding to a particular user on a printing device having one or more processes executing on the printing device, wherein execution of the instructions by one or more processors causes:
   a device agent receiving, over a network from a device manager, one or more device commands to modify the usage information corresponding to a particular user and stored on a memory in the printing device, wherein a modification of the usage information corresponding to a particular user is performed concurrently with execution of one or more processes operating on the printing device and during a suspension of one or more print jobs;
   wherein the device agent comprises remote debugging logic, and wherein the one or more device commands are in a format that is supported by the device manager and not supported by the remote debugging logic;
   accessing a table that maps a plurality of device commands to modify usage information into a plurality of modification instructions, wherein the plurality of modification instructions are supported by the remote debugging logic;
   identifying, based upon the table, one or more modification instructions that both correspond to the one or more device commands and that are supported by the remote debugging logic;
   causing the one or more modification instructions to be executed to modify the usage information stored in the memory to allow resumption of the one or more print jobs; and
   resumption of the one or more processes.

9. The non-transitory computer-readable storage medium of claim 8, wherein the usage information includes username, and further includes one or more of function permissions, function parameters, balance, and print priority.

10. The non-transitory computer-readable storage medium of claim 9, wherein the function permissions includes permissions for one or more of copy, printer, scanner, and facsimile transmission.

11. The non-transitory computer-readable storage medium of claim 8, wherein the instructions further configure a table that maps one or more items of usage information into one or more memory locations in the memory storing the usage information.

12. The non-transitory computer-readable storage medium of claim 8, wherein the device agent is further configured to present a user interface configured to display usage information and to accept device commands to modify the usage information.

13. The non-transitory computer-readable storage medium of claim 12, wherein the one or more modification instructions include one or more instructions that when executed modify one or more elements of the user interface.

14. The non-transitory computer-readable storage medium of claim 12, wherein the user interface is a web page that is displayed on an administrative computer.

15. A computer-implemented method, comprising:
   executing one or more processes on a printing device;
   a device agent receiving, over a network from a device manager, one or more device commands to modify usage information corresponding to a particular user and stored on a memory in the printing device, wherein a modification of the usage information corresponding to a particular user is performed concurrently with the execution of the one or more processes on the printing device and during a suspension of one or more print jobs;
   wherein the device agent comprises remote debugging logic, and wherein the one or more device commands are in a format that is supported by the device manager and not supported by the remote debugging logic;

accessing a table that maps a plurality of device commands to modify usage information into a plurality of modification instructions, wherein the plurality of modification instructions are supported by the remote debugging logic;

identifying, based upon the table, one or more modification instructions that both correspond to the one or more device commands and that are supported by the remote debugging logic;

causing the one or more modification instructions to be executed to modify the usage information stored in the memory to allow resumption of the one or more print jobs; and resuming the one or more processes.

16. The computer-implemented method of claim 15, wherein the usage information includes username, and further includes one or more of function permissions, function parameters, balance, and print priority.

17. The computer-implemented method of claim 16, wherein the function permissions includes permissions for one or more of copy, printer, scanner, and facsimile transmission.

18. The computer-implemented method of claim 15, wherein the device agent is further configured to present a user interface configured to display usage information and to accept device commands to modify the usage information.

19. The computer-implemented method of claim 18, wherein the one or more modification instructions include one or more instructions that when executed modify one or more elements of the user interface.

20. The computer-implemented method of claim 18, wherein the user interface is a web page that is displayed on an administrative computer.

\* \* \* \* \*